United States Patent Office 2,876,267
Patented Mar. 3, 1959

2,876,267

PURIFICATION OF 4-CHLORONITROTOLUENES

Leslie M. Schenck, Westfield, N. J., assignor to General Aniline & Film Corporation, New York, N. Y., a corporation of Delaware No Drawing. Application February 15, 1957
Serial No. 640,311

6 Claims. (Cl. 260—646)

The present invention relates to the purification of 4-chloronitrotoluenes, and in particular to an improved method of diminishing dinitro bodies in the crude mixture of 4-chloro-2-nitrotoluene and 4-chloro-3-nitrotoluene resultant from the mononitration of 4-chlorotoluene.

It is well known that 4-chloro-2- and 4-chloro-3-nitrotoluenes are prepared by the nitration of p-chlorotoluene. Goldschmidt and Honig, Ber., 19, 2440, 2442 (1886), report the formation of 4-chloro-3-nitrotoluene, together with the isomer 4-chloro-2-nitrotoluene, by the nitration of p-chlorotoluene with nitric acid in the presence of sulfuric acid. During the same era, Beilstein and Kuhlberg, Ann., 158, 336, prepared 4-chloro-2-nitrotoluene by a replacement of the amino group with chlorine in 2-nitro-4-aminotoluene by diazotization, and Gatterman and Kaiser, Ber., 18, 2600 (1885), effected the formation of 4-chloro-3-nitrotoluene by the addition of sodium nitrite to a boiling mixture of 3-nitro-4-aminotoluene, cuprous chloride and hydrochloric acid, thereby replacing the amino group by halogen.

During later investigations, Gindraux, Helv. Chim. Acta 12, 921–34 (1929), studied the nitration of p-chlorotoluene under varying conditions, and states that this nitration gives a product consisting of 53–62.5% 4-chloro-2-nitrotoluene, the remaining 37.5–47% being 4-chloro-3-nitro toluene. In a comprehensive work on the nitration of p-chlorotoluene and p-bromotoluene, patterned on the study of the nitration of p-bromotoluene by Holleman, Rec. Trav. Chim. 34, 283 (1915), Shaw and Turner, J. Chem. Soc. 1884 (1932) obtained the following isomerides by nitrating 4-chlorotoluene with excess nitric acid at varying temperature conditions:

| Temp., °C. | Percent 4-chloro-2-nitrotoluene | Percent 4-chloro-3-nitrotoluene |
|---|---|---|
| −15 | 64.4±0.2 | 35.6±0.2 |
| 0 | 62.0 | 38.0 |
| 0–50 | 58.8 | 41.2 |

Fry, J. Am. Chem. Soc. 38, 1327 (1916) obtained figures indicating 36.18% of the 3-nitroisomer.

Hodgson and Anderson, J. Chem. Soc. 125, 2195 (1924), confirmed earlier work of Holleman, Rec. Trav. Chim. 28, 408 (1909), finding 58 and 58.8%, respectively, of 4-chloro-2-nitrotoluene in comparison with Holleman's 58% by direct nitration over 45 minutes and 60 minutes with an excess of nitric acid. Using 5 parts sulfuric acid ($d=1.84$) with a 15% excess of nitric acid ($d=1.48$), these authors report the 2 and 3 nitro isomers in the ratio of 64–65/36–35, with a solidification point of 14° C. Using a mixture of nitric acid, phosphoric oxide and acetic anhydride, a 50:50 isomer distribution was obtained.

A typical commercial process for the manufacture of 4-chloro-2-nitrotoluene and 4-chloro-3-nitrotoluene is described in B. I. O. S. 1145, p. 22. In this process, 3500 kg. p-chlorotoluene, S. P. 6.8–7.0° C., is nitrated at 15–20° C. over a period of 4–5 hours by the addition of 5060 kg. of a nitrating acid composed of 60% sulfuric acid, 35% nitric acid and 5% water. The crude filtration mixture is diluted with water, and the oil layer separated and washed with water and dilute soda ash solution. The crude product thereby obtained has the following specifications:

S. P. 18–18.5.
About 65% 4-chloro-2-nitrotoluene.
About 35% 4-chloro-3-nitrotoluene.
Some dinitrochlorotoluene.

The crude product is separated into its two major components by alternate fractional distillations and freezing operations until there is eventually obtained 4-chloro-2-nitrotoluene, S. P. 35.9, and 4-chloro-3-nitrotoluene, S. P. 6.2–6.3° C. There remains a 3–5% residue which is chiefly dinitro products, and is burned. A typical flow, based on the separation of o- and p-nitrochlorobenzene, is given in Groggins, Unit Processes in Organic Synthesis, McGraw Hill Book Co., N. Y., 1951, p. 71.

It is of interest to note that the commercial process mentions the formation of higher nitration products, which are concentrated through the processing of the crude nitration mixture to give a total residue of 3–5% consisting chiefly of dinitrochlorotoluenes. Since dinitro and higher nitrated aromatic compounds are known to be hazardous from an explosion aspect (see Sax, Handbook of Dangerous Material, Reinhold Publishing Company, 1951), it is readily understood that in the manufacture of mononitrated aromatics, where an eventual distillation step is required, great care must be exercised to reduce dinitration to an absolute minimum to insure safety in this operation. Groggins, loc. cit., p. 34, realizes this important fact and states "In contradistinction to sulfonation, the nitrating temperature has comparatively no directive influence on the position taken by the entering —$NO_2$ group, but it is of importance in controlling the purity of the reaction product. With ascending temperatures, the degree of nitration is increased so that a proportional amount of a higher nitrated product is formed. The deleterious influence that such impurities may exercise in subsequent operation is apparent."

In laboratory application of the prior art, I have found that nitrations conducted as those described in the literature produce 0.5–3% of higher nitration products, thereby decreasing the purity of the product, as well as contributing to greater difficulty, expense and hazard in obtaining the separate isomers in their desired state of purity. For the processes described in prior art to be feasible, they must be operated at temperatures above the freezing point of the reactants and product, i. e. ca. 10–20° C., thereby contributing to the formation of undesirable higher nitration products.

The provision of a new and practical approach for treatment of the crude nitration product of 4-chlorotoluene that not only allows the separation of the two chief nitration isomers in purer form, but also substantially eliminates the hazards attendant the distillation of a mononitro body contaminated with trace amounts of higher nitration products—constitutes the principal object of the present invention.

Other objects and advantages will become more clearly manifest from the following description.

I have discovered a method of still further reducing the dinitro content of substantially mononitrated 4-chlorotoluene, prepared by any of the methods disclosed in the prior art. The operation of my invention can be integrated into the normal commercial process for the manufacture of 4-chloro-2-nitrotoluene and 4-chloro-3-nitrotoluene as described in B. I. O. S. 1145, p. 22; or my invention can be applied as an added step to the manufacturing process. In operation, my invention consists of incorporating a mild oxidizing agent with a hot aqueous alkaline wash of the nitro bodies. It is my preference that a chemical with an oxidation-reduction potential as found in potassium or sodium ferricyanide be employed, however other oxidizing agents may be used to good advantage. The exact mechanism of my invention in reducing dinitro content is not known. Borsche and Berkhout, Ann. 330, p. 95 report 4-nitroso-o-cresol is converted to 4-nitro-o-cresol by the action of the ferricyanide ion in alkaline solution. It is obvious from their teaching that a mononitro aromatic is stable to the mild oxidizing action of ferricyanide. In my invention, the most probable chemical explanation for the reduction of dinitro compounds in mononitrated chlorotoluenes treated with aqueous alkaline oxidizing agents must be the oxidization of a benzenoid carbon to hydrogen linkage activated by the presence of two nitro groups in the benzene ring to a benzenoid carbon-oxygen-hydrogen linkage as exemplified by a phenol, the latter substituted dinitro phenol being alkali soluble, and thereby removed from the alkali-insoluble mono-nitrated chlorotoluene leaving a crude nitration product greatly reduced in dinitro content, and of purer quality and less hazardous in explosive properties for further processing.

In commercial distillation practice of mono-nitrated compounds, distillation residues which contain over five percent of a dinitro derivative are considered a potential explosive hazard. The commercial significance of my invention can be best understood if an arbitrary quantity, say 10,000 lbs., of crude mononitrated 4-chlorotoluene is considered for distillation. Should this 10,000 lbs. quantity contain 0.4% by weight of dinitrated material, or 40 lbs., a still residue of 800 lbs. will remain when the dinitro content reaches 5.0% due to the fractionation. However, if the initial dinitro content can be reduced to 0.2% by weight, or a total of 20 lbs. dinitrated material, the still residue can safely be fractionated until only 400 lbs. with 5.0% dinitro content remains. effectively increasing the yield of the operation from 9,200 lbs. to 9,600 lbs. of usable product. From this illustrative example. it is readily seen that the slight reduction in original dinitro content is evidenced in vastly increased recovery of product without involving further processing steps on a residue rich in dinitro content.

It will become manifest to those skilled in the art that my new discovery discloses a useful method for lessening the dinitro content of the crude mononitration isomers of p-chlorotoluene produced by methods taught in the prior art. It is to be understood that my teachings, as exemplified by the removal of dinitrochlorotoluenes in mononitrochlorotoluenes, can be extended to include the removal or partial removal of unwanted dinitrated products from other mononitration mixtures whereby mild oxidation will convert the dinitro compound to a chemical moiety susceptible to removal in an alkaline wash liquor, by solubility or other known factor.

The method according to my invention is applicable to mixtures of crude 4-chloro-2-nitro- and 4-chloro-3-nitrotoluenes in which the isomer ratio ranges from 50/50 to 70/30 respectively.

As illustrative examples of oxidizing agents that I may employ in my process, I found air, sodium or potassium permanganate, hydrogen peroxide and the sodium or potassium ferricyanide very effective.

The invention is further illustrated by the following examples, but it is to be understood that the invention claimed is not limited thereto.

*Example I*

100 grams of crude 4-chloro-2-nitrotoluene and 4-chloro-3-nitrotoluene, with an isomer ratio of 65/35% respectively, a S. P. (solidification point) of 18.1° C., and containing 0.4% by weight dinitro impurity is heated at 100° C. for four hours with 210 grams of water, 10 grams of sodium hydroxide and 20 grams of potassium ferricyanide. Upon cooling and separation of the oil layer from the aqueous layer, there is obtained over 99 grams of crude nitrochlorotoluene with a dinitro content of 0.1% by weight.

*Example II*

100 grams of crude 4-chloro-2-nitrotoluene and 4-chloro-3-nitrotoluene with an isomer ratio of 65/35% respectively, a S. P. of 18.1° C., and containing 0.4% by weight dinitro impurity is heated at 90° C. for four hours with 200 grams of water and 10 grams of sodium hydroxide, with a gentle stream of air being passed through the admixture during the operation. Upon cooling, the oil layer now contains 0.2% by weight dinitro derivative.

*Example III*

100 grams of crude 4-chloro-2-nitrotoluene and 4-chloro-3-nitrotoluene, with an isomer ratio of 65/35% respectively, a S. P. of 18.1° C., and containing 0.4% by weight of dinitro impurities is agitated at 25° C. for four hours with a solution of 200 grams of water, 10 grams of sodium hydroxide and 10 grams of potassium permanganate. The resultant oil layer has a dinitro content of 0.3% by weight after four hours.

*Example IV*

350 grams of p-chlorotoluene is nitrated in the manner given in B. I. O. S. 1145, p. 22. In processing, the separated oil layer is washed with 500 grams of cold water, then divided into two equal parts. One part "A" is warmed at 70° C. for five hours with a solution of 10 grams of sodium ferricyanide dissolved in 150 grams 5% by weight of sodium carbonate. Following separation of the crude oil layers, part "A" was found to contain 0.2% by weight dinitro impurity and the untreated part "B" was found to contain 0.6% by weight dinitro impurity.

*Example V*

820 grams of crude 4-chloro-2-nitrotoluene and 4-chloro-3-nitrotoluene with an isomer ratio of 70/30% respectively, a S. P. of 21.5° C., and containing 0.2% by weight of dinitro impurities was divided into two equal portions.

A 410 grams of the above crude mixture, containing 0.2% by weight (0.82 gram) dinitro impurity was distilled to yield 345 grams of distillate containing 0.0% by weight dinitro compound and 64.5 grams residue analyzing 1.5% by weight (0.95 gram) of dinitro impurity.

B

The second, 410 gram, portion of the above crude mixture was refluxed four hours with a solution of 25 grams of sodium hydroxide, 50 grams of potassium ferricyanide and 600 grams of water. The oil layer (405 grams) was separated, and found to now contain 0.08% by weight dinitro impurity. 335 grams of the purified oil, containing 0.268 grams dinitro impurity, was distilled as in "A" to yield a distillate containing 0.0% by weight dinitro compound and 48.3 grams residue containing 0.5% by weight (0.255 gram) dinitro impurity.

*Example VI*

Example I was repeated with the exception that 20 grams of potassium ferricyanate was replaced by 4 grams of a 30% aqueous hydrogen peroxide solution. Upon cooling and separation of the oil layer from the aqueous layer, there is obtained over 99 grams of crude nitrochlorotoluene with a dinitro content of 0.15% by weight.

From the foregoing examples it is clearly evident that the alkaline wash containing a mild oxidizing agent in the processing treatment consists normally of an aqueous solution containing 4 to 6% by weight of an inorganic alkali, i. e. sodium or potassium hydroxide or sodium or potassium carbonate, and from 3 to 9% by weight of the solid oxidizing agent. Where a liquid oxidizing agent is employed such as hydrogen peroxide of 10% to 70% concentration, the weight employed may vary from 3% to 20%. In the case where air is employed as the oxidizing agent, I prefer to employ 4-5% by weight of an aqueous alkaline solution.

I claim:

1. In the process of purifying a crude mixture of 4-chloronitrotoluenes, the improvement of reducing the dinitrochlorotoluene content of the crude mixture which comprises treating the said crude mixture with an aqueous alkaline wash containing an alkaline material selected from the group consisting of sodium and potassium hydroxides and sodium and potassium carbonates, an oxidizing agent selected from the class consisting of air, hydrogen peroxide, and alkali metal salts selected from the group consisting of sodium and potassium salts of ferricyanic and permanganic acids, and separating the oil layer.

2. The process according to claim 1, wherein the oxidizing agent is air.

3. The process according to claim 1, wherein the oxidizing agent is potassium ferricyanide.

4. The process according to claim 1, wherein the oxidizing agent is potassium permanganate.

5. The process according to claim 1, wherein the oxidizing agent is sodium ferricyanide.

6. The process according to claim 1, wherein the oxidizing agent is hydrogen peroxide.

References Cited in the file of this patent

UNITED STATES PATENTS 1,586,253    Livingston _____ May 25, 1926

UNITED STATES PATENT OFFICE

CERTIFICATE OF CORRECTION

Patent No. 2,876,267                                         March 31, 1959

Leslie M. Schenck

It is hereby certified that error appears in the printed specification of the above numbered patent requiring correction and that the said Letters Patent should read as corrected below.

Column 2, line 2, for "filtration" read -- nitration --.

Signed and sealed this 1st day of December 1959.

(SEAL)

Attest:

KARL H. AXLINE
Attesting Officer

ROBERT C. WATSON
Commissioner of Patents